(12) United States Patent
Gaddy et al.

(10) Patent No.: US 9,197,673 B1
(45) Date of Patent: Nov. 24, 2015

(54) SYSTEM AND METHOD FOR RECEPTION AND TRANSMISSION OPTIMIZATION OF SECURED VIDEO, IMAGE, AUDIO, AND OTHER MEDIA TRAFFIC VIA PROXY

(71) Applicant: A2Zlogix, Inc., Edison, NJ (US)

(72) Inventors: William L. Gaddy, Milford, PA (US); Vidhya Seran, Irving, TX (US); Stephen Andrew Norwalk, North Huntingdon, PA (US); John Galluzzo, Londonderry, NH (US); Vincent James Spinella, Colts Neck, NJ (US)

(73) Assignee: A2Zlogix, Inc., Edison, NJ (US)

( * ) Notice: Subject to any disclaimer, the term of this patent is extended or adjusted under 35 U.S.C. 154(b) by 0 days.

(21) Appl. No.: 14/714,960

(22) Filed: May 18, 2015

(51) Int. Cl.
  *H04L 29/06* (2006.01)

(52) U.S. Cl.
  CPC ............ *H04L 63/20* (2013.01); *H04L 63/0281* (2013.01); *H04L 63/0823* (2013.01)

(58) Field of Classification Search
  USPC .......................................................... 726/12
  See application file for complete search history.

(56) References Cited

U.S. PATENT DOCUMENTS

| | | | | |
|---|---|---|---|---|
| 6,135,646 A * | 10/2000 | Kahn | ....................... | G06F 21/10 707/999.104 |
| 6,823,454 B1 * | 11/2004 | Hind et al. | ..................... | 713/168 |
| 7,225,156 B2 * | 5/2007 | Fisher | .................... | G06Q 20/02 235/379 |
| 8,307,203 B2 * | 11/2012 | Fraleigh et al. | ................ | 713/156 |
| 8,327,128 B1 * | 12/2012 | Prince | ................. | H04L 63/0823 713/150 |
| 8,473,620 B2 * | 6/2013 | Demmer | .................. | H04L 41/12 709/227 |
| 8,478,986 B2 * | 7/2013 | Merugu | .............. | H04L 63/0281 713/153 |
| 8,566,580 B2 * | 10/2013 | Ben-Itzhak et al. | .......... | 713/156 |
| 8,713,633 B2 * | 4/2014 | Thomas | .............. | H04L 63/0815 726/2 |
| 8,782,393 B1 * | 7/2014 | Rothstein | ................ | G06F 21/00 705/75 |
| 2002/0120841 A1 * | 8/2002 | Yellepeddy et al. | .......... | 713/156 |
| 2005/0071632 A1 * | 3/2005 | Pauker et al. | ................. | 713/165 |
| 2005/0074124 A1 * | 4/2005 | Thornton et al. | ............. | 380/277 |
| 2007/0079113 A1 * | 4/2007 | Kulkarni et al. | .............. | 713/150 |
| 2008/0072292 A1 * | 3/2008 | Narjala | ............................ | 726/4 |
| 2008/0263215 A1 * | 10/2008 | Schnellbaecher | ............. | 709/229 |

(Continued)

OTHER PUBLICATIONS

IBM, 'Sterling B2 Itegrator Security (5.23 or higher)', Vers. 5.23, 2000, IBM Corp., entire document, ftp://public.dhe.ibm.com/software/commerce/doc/sb2bi/v5r2/SI523_Security_Book.pdf.*

(Continued)

*Primary Examiner* — Christopher Brown
*Assistant Examiner* — Ronald Baum
(74) *Attorney, Agent, or Firm* — Lowenstein Sandler LLP

(57) ABSTRACT

A proxy server may receive from a user endpoint, a secure connection request to a second server. The secure connection request may comprise a globally unique identifier registered for the endpoint. The proxy server may intercept, from the user endpoint, a first secure handshake with the second server. The proxy server may initiate a second secure handshake with the second server based on the intercepted first secure handshake. The proxy server may intercept from the second server a second secure handshake response comprising a server certificate with metadata. The proxy server may generate a second certificate using the metadata and signed with a first certificate authority associated with the globally unique identifier registered for the endpoint. The proxy server may transmit to the user endpoint a modified response to the secure connection request secured with the second certificate to establish a proxied secure connection.

15 Claims, 10 Drawing Sheets

(56) References Cited

U.S. PATENT DOCUMENTS

| | | | |
|---|---|---|---|
| 2010/0146260 A1* | 6/2010 | Levow et al. | 713/154 |
| 2011/0107379 A1* | 5/2011 | Lajoie et al. | 725/87 |
| 2014/0281503 A1* | 9/2014 | Mills | H04L 9/3263 713/157 |
| 2015/0156183 A1* | 6/2015 | Beyer | H04L 63/08 726/4 |
| 2015/0188949 A1* | 7/2015 | Mahaffey et al. | 726/1 |

OTHER PUBLICATIONS

Nagappan, R., et al, 'Securing Oracle E-Business Suite Applications Using Oracle Solaris 11 on SPARC T5 and SPARC M5-32 Servers', Oracle [White Paper], Jun. 2013, entire document, http://www.oracle.com/technetwork/server-storage/sun-sparc-enterprise/documentation/o13-044-t5-ebssecurity-1964593.pdf.*

\* cited by examiner

SYSTEM AND METHOD FOR RECEPTION AND TRANSMISSION OPTIMIZATION OF SECURED VIDEO, IMAGE, AUDIO, AND OTHER MEDIA TRAFFIC VIA PROXY

TECHNICAL FIELD

Embodiments of the present disclosure relate to network optimization, and, more particularly, to the field of reception and transmission optimization of secured video, image, audio, and other media traffic via a proxy server.

BACKGROUND

The downloading and uploading of images and video by end users over operator networks such as DOCSIS, Ethernet, fixed-line, WIFI, 3G and 4G LTE infrastructure presents an ever increasing challenge for operators as finite numbers of links become more and more saturated. A common technique for reducing load on the packet core of the network is to cache commonly-used content near an access point, whereby requests for the content are serviced locally instead of reaching all the way through the core network, as that taught in U.S. Pat. No. 7,770,198. Other techniques that reduce load on the last-mile side of the network include TCP window optimization such as taught in U.S. Pat. No. 8,639,835, and compressing text traffic between a packet core and a user endpoint or handset, as taught in U.S. Pat. No. 8,792,408.

Several techniques specific to optimizing image and video download are known in the art, such as just-in-time transcoding and transrating of content before sending through the last mile of the network, as taught in U.S. Pat. No. 6,628,300. None of these techniques or any others in the art address the problem of optimizing image and video upload. Further, none of these techniques address the problem of optimizing image and video download nor upload when such traffic is secured with protocols such as HTTPS or SSL. Such traffic comprises a growing percentage of traffic transiting over most operator networks and presents a serious challenge to operators wishing to optimize such traffic flows.

While there exist well known techniques for proxying of HTTPS and SSL traffic such as those taught in U.S. Pat. No. 8,214,635 (the '635 patent), these techniques are directed to purposes of deep packet inspection and filtering of traffic, not media optimization. Further, these techniques expose serious security risks.

In the '635 patent, a common root certificate authority is shared between the proxy/firewall and all user endpoints. This is useful for circumstances at an enterprise where for regulatory compliance, all traffic must be inspected and logged, including traffic secured with HTTPS and SSL, and the enterprise maintains some manner of physical access control to the user endpoints. However, a determined actor in possession of any single one of these user endpoints can perform cryptanalysis on the shared root certificate authority in their possession. Once the private key is obtained from this certificate authority, all secured traffic from all user endpoints within the network behind the proxy/firewall can be intercepted, presenting a serious security risk.

Some parental control software and ad-insertion software uses similar methods and present similar security risks. In fact, these risks can be more severe than compromising all endpoints behind a single proxy, as many of the aforementioned methods and proxies use a common vendor library, which the same root certificate authority. In such circumstances, once the private key for a certificate authority is obtained, all endpoints with any software using the single library can be compromised.

Contemporaneous to the filing of this disclosure, several such incidents were disclosed and reported in the media ("Lenovo Pulls Laptop App After Security Warnings", Wall Street Journal, Feb. 19, 2015, and U.S. Department of Homeland Security, US-CERT Alert TA15-051A, "Lenovo Superfish Adware Vulnerable to HTTPS Spoofing", Feb. 20, 2015).

SUMMARY

The above-described problems are remedied and a technical solution is achieved in the art by providing a system and method for a user endpoint communicating with a proxy server to receive image, video, audio, or other media data from a second server via the proxy server. The proxy server may receive from a user endpoint, a secure connection request to a second server. The secure connection request may comprise a globally unique identifier registered for the endpoint. The proxy server may initiate a first secure handshake with the second server. The proxy server may receive from the second server a first secure handshake response comprising a server certificate with metadata. The proxy server may generate a second certificate using the metadata and signed with a first certificate authority associated with the globally unique identifier registered for the endpoint. The proxy server may transmit to the user endpoint a modified response to the secure connection request secured with the second certificate to establish a proxied secure connection.

In an example, prior to receiving the secure connection request to the second server, the proxy server may receive the first certificate authority. The first certificate authority may also be installed on the user endpoint. The first certificate authority may be generated using the globally unique identifier. The proxy server may receive a registration that distinguishes the first certificate authority from other certificate authorities based on the globally unique identifier employed as a primary key.

In an example, the proxy server may request a media asset by the user endpoint from the second server and optimizing reception of the media asset. Accordingly, the proxy server may intercept from the user endpoint, a media receive request intended for the second server comprising a payload from the user endpoint. The proxy server may decrypt the payload using a private key of the second certificate. The proxy server may create a media request to the second server by encrypting the payload with the public key of the server certificate. The proxy server may forward the encrypted payload to the second server.

In an example, the proxy server may receive an encrypted media receive response from the second server containing media data encrypted with the generated second server certificate private key. The proxy server may decrypt the media receive response with the public key of the second server certificate to obtain a media receive payload. The proxy server may pass the media receive payload through the media pre-filtering processor of the proxy server to obtain a pre-filtered payload. The proxy server may encrypt the pre-filtered payload with the second certificate private key to create a pre-filtered media receive response. The proxy server may forward the pre-filtered media receive response to the user endpoint.

In an example, the proxy server passing the media receive payload through the media pre-filtering processor may comprise media pre-filtering processor performing at least one of resolution reduction, dynamic range reduction, frame rate reduction, spatial high frequency reduction, spatio-temporal high frequency reduction, entropy coding of protocol headers, or DCT or wavelet coefficient re-quantization of the media, audio, images or video payloads.

In an example, prior to receiving a first secure connection, the proxy server may receive a configuration to incorporate or communicate with a media pre-filtering processor to generated pre-filtered media, audio, images or video payloads.

In an example, the rule or policy may be at least predicated on presence of the corresponding one of the certificate authorities on the user endpoint.

In an example, the proxy server may communicate the media receive payload to a transcoding or a transrating service using the internet content adaptation protocol (ICAP). In an example, the proxy server communicates the media receive payload to a transcoding or a transrating service using asynchronous application programming interface (API) calls.

The above-described problems are remedied and a technical solution is achieved in the art by providing a system and method for a user endpoint communicating with a proxy server to post media, audio, image or video data to a second server via the proxy server.

The proxy server may receive from a user endpoint, a secure connection request to a second server. The secure connection request may comprise a globally unique identifier registered for the endpoint. The proxy server may initiate a first secure handshake with the second server. The proxy server may receive from the second server a first secure handshake response comprising a server certificate with metadata. The proxy server may generate a second certificate using the metadata and signed with a first certificate authority associated with the globally unique identifier registered for the endpoint. The proxy server may transmit to the user endpoint a modified response to the secure connection request secured with the second certificate to establish a proxied secure connection.

In an example, prior to receiving the secure connection request to the second server, the proxy server may receive the first certificate authority. The first certificate authority may also be installed on the user endpoint. The first certificate authority may be generated using the globally unique identifier. The proxy server may receive a registration that distinguishes the first certificate authority from other certificate authorities based on the globally unique identifier employed as a primary key.

In an example, the proxy server may post a media asset by a user endpoint to a second server and optimizing the transmission of the media asset. Accordingly, the proxy server may intercept from the user endpoint, a media send request comprising a pre-filtered media payload to the second server via the proxied secure connection. The proxy server may decrypt the payload using a private key of the second certificate. The proxy server may pass the pre-filtered media payload through the post-filtering processor to obtain a post-filtered media payload. The proxy server may encrypt the post-filtered media payload with the generated certificate private key to create a second media post request. The proxy server may forward the encrypted second media post request to the second server.

In an example, the proxy server passing the pre-filtered media payload through the post-filtering processor may comprise the post-filtering processor performing one or more of super-resolution or non-linear interpolation methods in any of the audio frequency, DCT, image spatial, color gamut, or video statio-temporal domains.

In an example, the proxy server may communicate the pre-filtered media receive payload to the post-filtering processor using the ICAP protocol. In an example, the proxy server may communicate the pre-filtered media receive payload to the post-filtering processor using asynchronous API calls.

BRIEF DESCRIPTION OF THE DRAWINGS

The present invention may be more readily understood from the detailed description of examples presented below presented below considered in conjunction with the attached drawings and in which like reference numerals refer to similar elements.

It is to be understood that the attached drawings are for purposes of illustrating the concepts of the invention and may not be to scale.

DETAILED DESCRIPTION

Embodiments of the present disclosure provide a system and method for reception and transmission optimization of secured media, audio, video and image traffic via proxy while being transparent to upstream services such as media distributors, photo and video sharing applications, audio streaming, and social network services.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring examples of the present disclosure.

Figure 1:
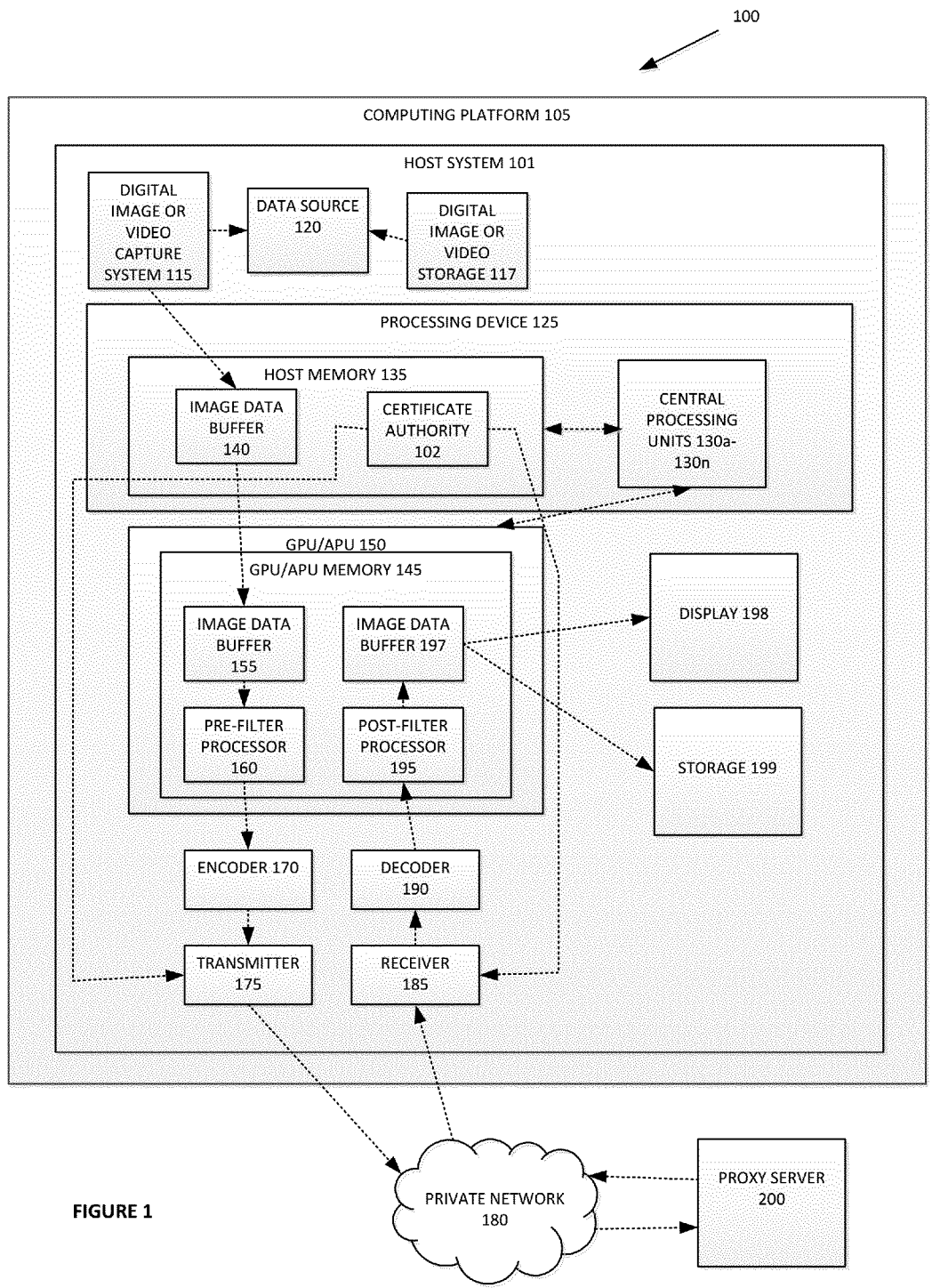
FIG. 1 is a block diagram of an example user endpoint configured to communicate with a proxy server, in which examples of the present disclosure may operate.

FIG. 1 is a block diagram of an example user endpoint 100 configured to communicate with a proxy server 210, in which examples of the present disclosure may operate. In one example, the user endpoint 100 may be configured to receive media, audio, image, video, or other content data. The user endpoint 100 may also include a computing platform 105. The computing platform 105 may comprise a host system 101, which may comprise, for example, a processing device 125, such as one or more central processing units 130a-130n. The processing device 125 may be coupled to a host memory 135. The host memory 135 may store the media, audio, image, video, or other content data from data source 120 received from at least one of a digital audio, digital image or video capturing system 115 or digital audio, image or video storage 117 in an image data buffer 140. The host memory 135 may further store a certificate authority 102 installed by a network operator (not shown).

The processing device 125 may further implement a graphics processing unit 150 (GPU). It will be appreciated by those skilled in the art that other co-processor architectures may be utilized besides GPUs, such as, but not limited to, DSPs, FPGAs, or ASICs, or adjunct fixed-function features of the processing device 125 itself. It will further be appreciated by those skilled in the art that the GPU 150 may be collocated on the same physical chip or logical device as the central processing units 130a-130n, also known as an "APU", such as found on mobile phones and tablets. Separate GPU and CPU functions may be found on computer server systems where the GPU is a physical expansion card, and personal computer systems and laptops. The GPU 150 may comprise a GPU memory 145. It will be appreciated by those skilled in the art that the host memory 135 and GPU memory 145 may also be collocated on the same physical chip(s) or logical device, such as on an APU.

The processing device 125 may be configured to receive audio, image, video, or other content data from the data source 120. The processing device 125 may be configured to create the image data buffer 140 based on the received audio, image, video, or other content data, which may be processed by a pre-filtering processor 160. The pre-filtering processor 160 may be configured to transfer processed audio, image, video, or other content data to an encoder 170 and a transmitter 175 for transmission of encrypted audio, image, video, or other content data to a computer platform 210 (e.g., of a proxy server 200) over a private network 180.

In another example, the user endpoint 100 may be configured to receive encrypted image, video, or other content data from the computer platform 210 (e.g., of the proxy server 200) over the private network 180. A receiver 185 and a decoder 190 may be configured to receive and decrypt, respectively, the encrypted audio, image, video, or other content data. The decoder 190 may be configured to transfer the decoded audio, image, video, or other content data to a post-filter processor 195 of the GPU 150. The audio, image, video, or other content data may be processed by the post-filter processor 195 and further transferred as an image data buffer 197 to a display or audio device 198 and/or storage 199.

Figure 2:
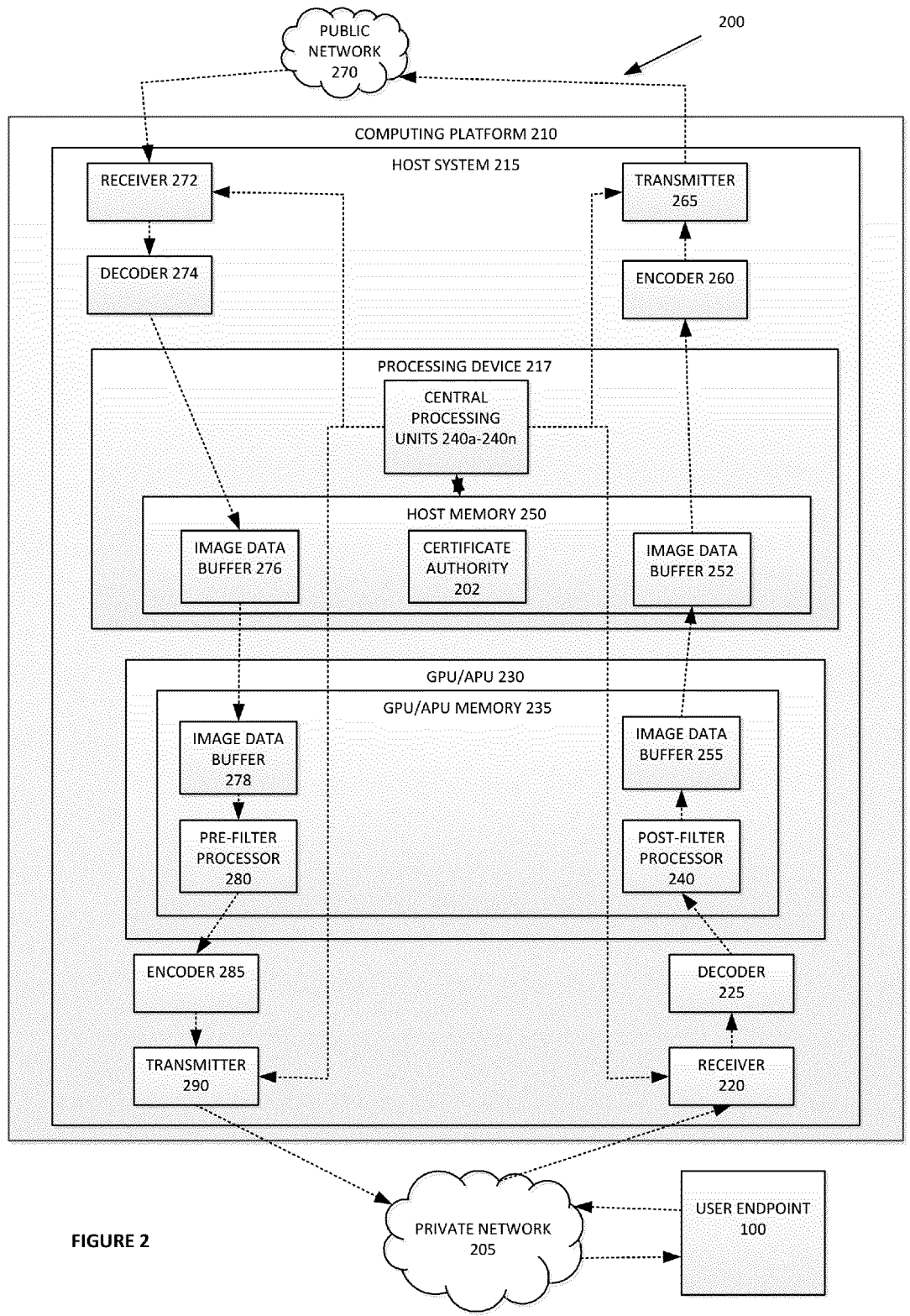
FIG. 2 is a block diagram that illustrates an example proxy server configured to communicate with the user endpoint and a second server (not shown), in which examples of the present disclosure may operate.

FIG. 2 is a block diagram that illustrates an example proxy server 200 configured to communicate with the user endpoint 100 and a second server (not shown), in which examples of the present disclosure may operate. In one example, the proxy server 200 may be configured to receive audio, image, video, or other content data from the second server (not shown) over a public network 270 (e.g., the Internet). The proxy server 200 may also include a computing platform 210. The computing platform 210 may comprise a host system 215, which may comprise, for example, a processing device 217, which may include one or more central processing units 240a-240n. The processing device 217 may be coupled to a host memory 250. The host memory 250 may store encrypted audio, image, video, or other content data in an image data buffer 276 of the host memory 250 that was received from the second server (not shown) after being received and decoded by a receiver 272 and decoder 274. The host memory 250 may further store a certificate authority 202 installed by a network operator (not shown).

The processing device 217 may further implement a graphics processing unit 230 (GPU). It will be appreciated by those skilled in the art that other co-processor architectures may be utilized besides GPUs, such as, but not limited to, DSPs, FPGAs, or ASICs, or adjunct fixed-function features of the processing device 217 itself. It will further be appreciated by those skilled in the art that the GPU 230 may be collocated on the same physical chip or logical device as the central processing units 240a-240n, also known as an "APU", such as found on mobile phones and tablets. Separate GPU and CPU functions may be found on computer server systems where the GPU is a physical expansion card, and personal computer systems and laptops. The GPU 230 may comprise a GPU memory 235. It will be appreciated by those skilled in the art that the host memory 250 and GPU memory 235 may also be collocated on the same physical chip(s) or logical device, such as on an APU.

The processing device 217 may be configured to create an image data buffer 278 based on the decrypted, received audio, image, video, or other content data transferred from the image data buffer 276 of the processing device 217. The decrypted, received audio, image, video, or other content data located in the image data buffer 278 may be processed by a pre-filtering processor 280. The pre-filtering processor 280 may be configured to transfer processed audio, image, video, or other content data to an encoder 285 and a transmitter 290 for transmission of encrypted audio, image, video, or other content data to a computing platform 105 (e.g., the user endpoint 100) over a private network 205.

In another example, the proxy server 200 may be configured to receive encrypted audio, image, video, or other content data from the computer platform 115 (e.g., the user endpoint 100) over a private network 205. A receiver 220 and a decoder 225 may be configured to receive and decrypt, respectively, the encrypted audio, image, video, or other content data. The decoder 225 may be configured to transfer the decoded audio, image, video, or other content data to a post-filter processor 240 of the GPU 230. The audio, image, video, or other content data may be processed by the post-filter processor 240 and further transferred as an image data buffer 252 of the processing device 217. One or more of the central processing units 240a-240n may be configured to transmit the audio, image, video, or other content data stored in the image data buffer 252 to be encrypted by an encoder 260 and then transmitted by a transmitter 265 over the public network 270 to the user endpoint 100 (not shown).

Figure 3:
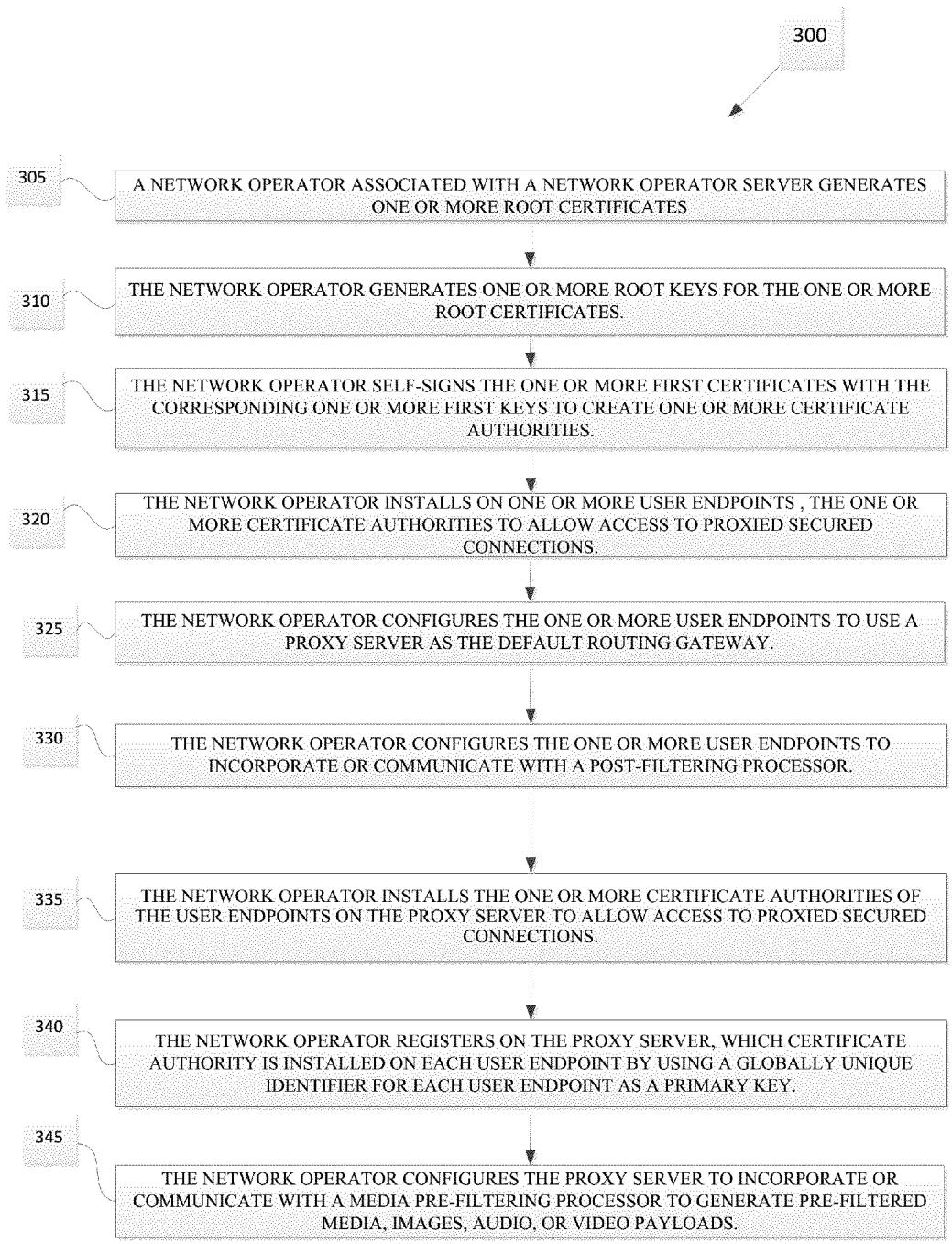
FIG. 3 is a flow diagram illustrating an example of a method associated with the systems of FIGS. 1 and 2, respectively, to prepare the systems for establishing subsequent proxied secure connections.

FIG. 3 is a flow diagram illustrating an example of a method 300 associated with the systems 100, 200 of FIGS. 1 and 2, respectively, to prepare the systems 100, 200 for establishing subsequent proxied secure connections. The method 300 may be performed by a computer system 1000 of FIG. 10 and may comprise hardware (e.g., circuitry, dedicated logic, programmable logic, microcode, etc.), software (e.g., instructions run on a processing device), or a combination thereof.

As shown in FIG. 3, at block 305, a network operator (not shown) associated with a network operator server (not shown) generates one or more root certificates. At block 310, the network operator generates one or more root keys for the one or more root certificates. At block 315, the network operator self-signs the one or more first certificates with the corresponding one or more first keys to create one or more certificate authorities (e.g., 102, 202). At block 320, the network operator installs on one or more user endpoints (e.g., the endpoint 100), the one or more certificate authorities (e.g., 102) to allow access to proxied secured connections. At block 325, the network operator configures the one or more user endpoints (e.g., the endpoint 100) to use a proxy server (e.g., 200) as the default routing gateway. At block 330, the network operator configures the one or more user endpoints (e.g., the endpoint 100) to incorporate or communicate with a post-filtering processor (e.g., 195).

At block 335, the network operator installs the one or more certificate authorities (e.g., 202) of the user endpoints (e.g., 100) on the proxy server (e.g., 200) to allow access to proxied secured connections. At block 340, the network operator registers on the proxy server (e.g., 200), which certificate authority (e.g., 102) is installed on each user endpoint (e.g., 100) by using a globally unique identifier for each user endpoint (e.g., 100) as a primary key. At block 345, the network operator configures the proxy server (e.g., 200) to incorporate or communicate with a media pre-filtering processor (e.g., 280) to generate pre-filtered media, audio, images or video payloads.

Figure 4:
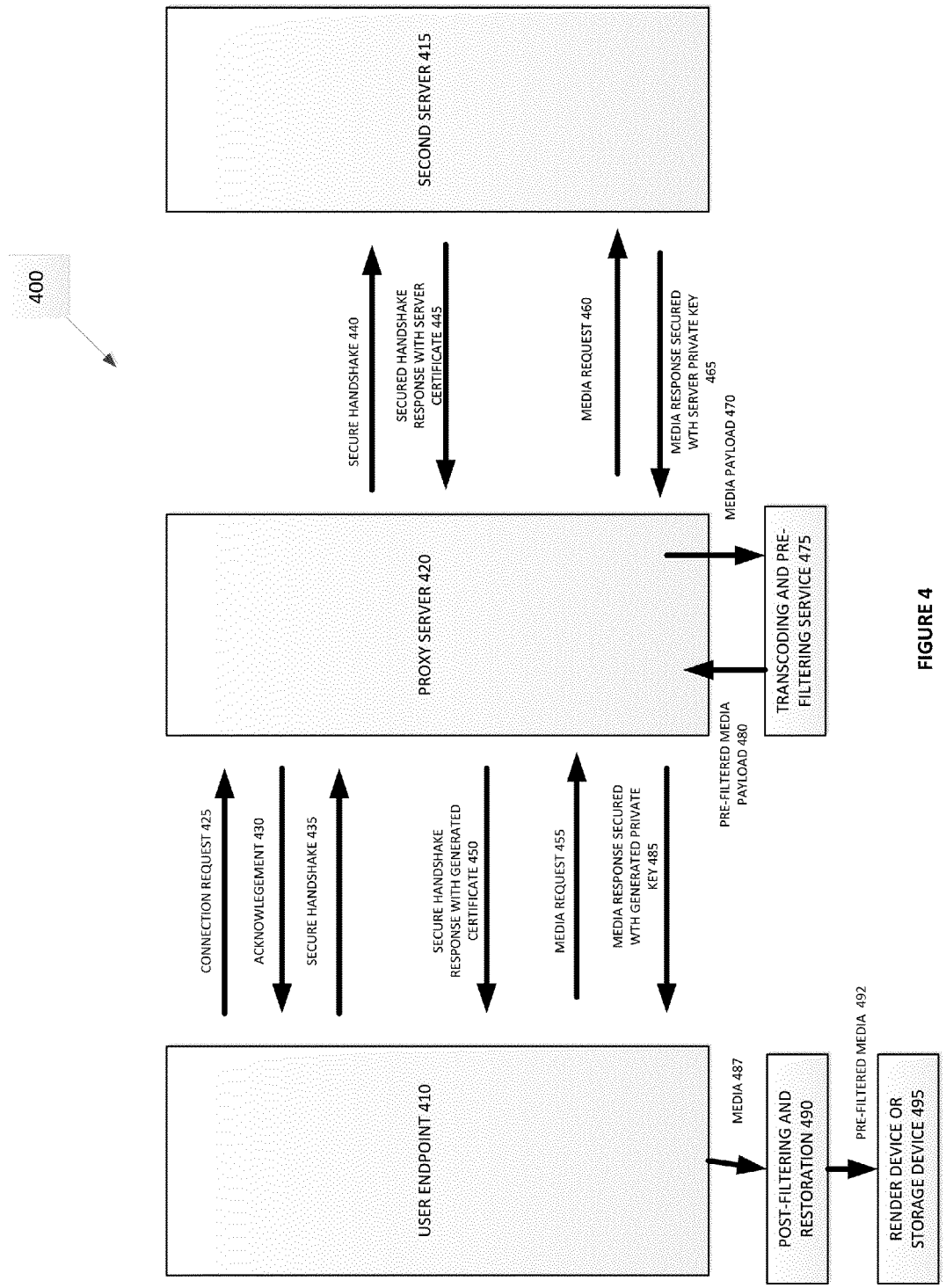
FIG. 4 is a protocol diagram that illustrates an example media request and reception data flow representing a user endpoint communicating with a proxy server to receive media, audio, image or video data from a second server via the proxy server, in which examples of the present disclosure may operate.
Figure 5:
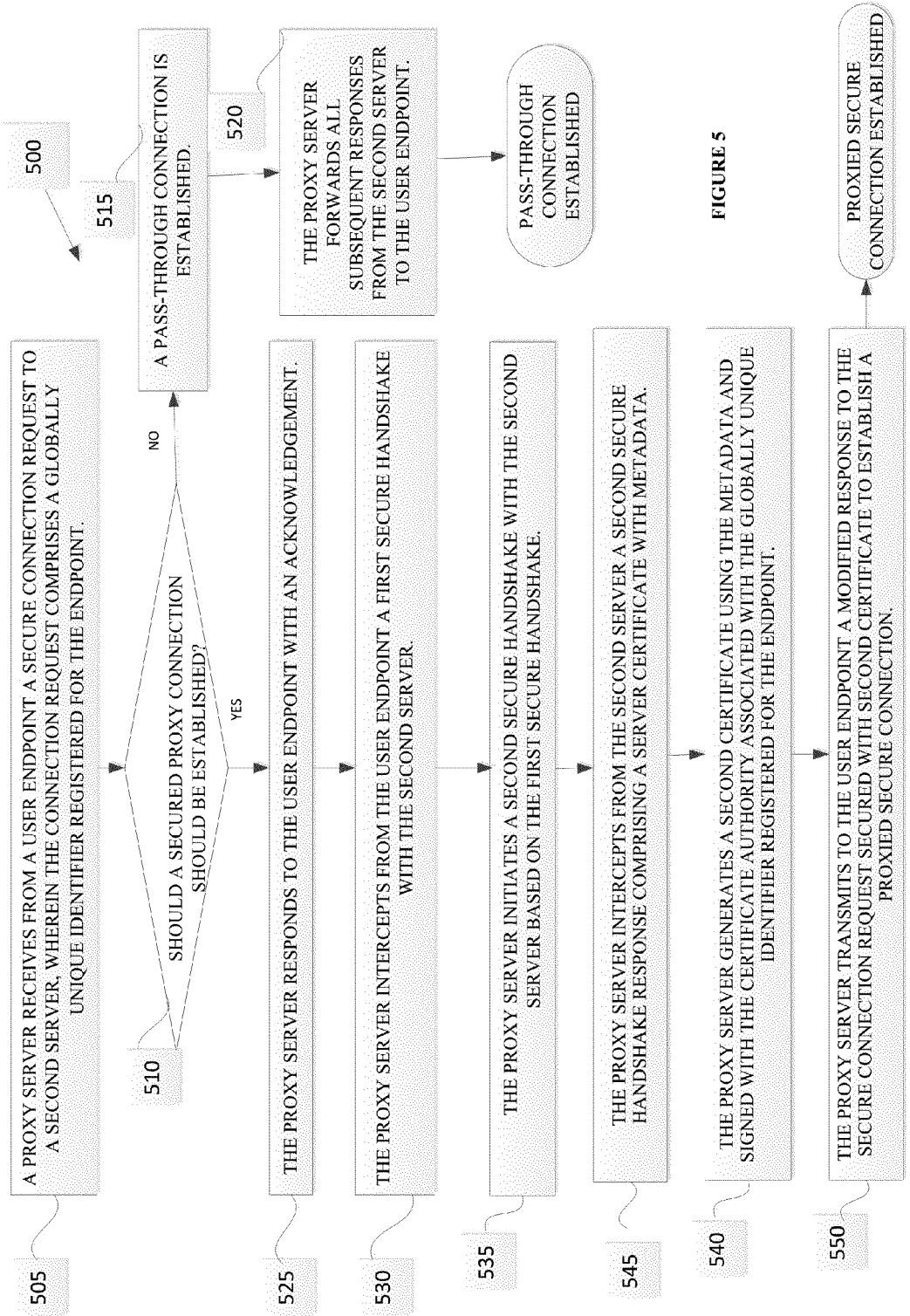
FIG. 5 is a flow diagram illustrating an example of a method for the user endpoint communicating with a proxy server to receive media, audio, image or video data from a second server via the proxy server, in which examples of the present disclosure may operate.

FIG. 4 is a protocol diagram 400 that illustrates an example media request and reception data flow representing a user endpoint 410 communicating with a proxy server 420 to receive audio, image or video data from a second server 415 via the proxy server 420, in which examples of the present disclosure may operate. FIG. 5 is a flow diagram illustrating an example of a method 500 for the user endpoint 410 communicating with a gateway proxy server 420 to receive audio, image or video data from a second server 415 via the proxy server 420, in which examples of the present disclosure may operate. The method 500 may be performed by a computer system 1000 of FIG. 10 and may comprise hardware (e.g., circuitry, dedicated logic, programmable logic, microcode, etc.), software (e.g., instructions run on a processing device), or a combination thereof. In one example, the method 500 may be performed primarily by the proxy server (e.g., 200, 320) of FIGS. 2 and 4.

As shown in FIGS. 1, 2, 4 and 5, at block 505, a proxy server (e.g., 200, 420) may receive from a user endpoint (e.g., 100, 410) a secure connection request 425 to a second server (e.g., 415). The secure connection request 425 may include a globally unique identifier registered for the endpoint (e.g., 100, 410). In an example, prior to receiving the secure connection request 425 to the second server (e.g., 415), upon the proxy server (e.g., 200, 420) may be installed a first certificate authority (e.g. Step 335 of method 300 in FIG. 3). The first certificate authority may also be installed on the user endpoint (e.g., 100, 410). The first certificate authority may be generated using the globally unique identifier. Prior to receiving the secure connection request 425 to the second server (e.g., 415), the proxy server (e.g., 200, 420) may receive a registration that distinguishes the first certificate authority from other certificate authorities based on the globally unique identifier employed as a primary key.

In an example, prior to receiving a first secure connection, the proxy server (e.g., 200, 420) may receive a configuration to incorporate or communicate with a media pre-filtering processor (e.g., 280) to generated pre-filtered media, audio, images or video payloads. If, at block 510, the proxy server (200, 420) determines that secure connection request 425 should be forwarded to the second server (e.g., 415) based on a rule or policy supplied by the network operator (not shown), then at block 515, a pass-through connection may be established, wherein the proxy server (200, 420) may forward the secure connection request 425 and all subsequent secure connection session traffic without changes between the user endpoint (100, 410) and the second server (e.g., 415). The rule or policy may be at least predicated on presence of the corresponding one of the certificate authorities (e.g., 102) on the user endpoint (e.g., 100, 410), information or policy supplied by the network operator, or the global identifier registration carried out in method step 340, or lack thereof. At block 520, the proxy server (200, 420) may forward all subsequent responses from the second server (e.g., 415) to the user endpoint (100, 410).

If, at block 510, the proxy server (e.g., 200, 420) determines that a secured proxy connection should be established, then at block 525, the proxy server (e.g., 200, 420) may respond to the user endpoint (e.g., 100, 410) with an acknowledgement 430 At block 530, the proxy server (e.g., 200, 420) may intercept from the user endpoint (e.g., 100, 410) a first secure handshake 435 with the second server (e.g., 415). The first secure handshake 435 may comprise the host name of the second server (e.g., 415). At block 535, the proxy server (200, 420) may not forward the first secure handshake 435 to second server (e.g., 415), but instead may initiate a second secure handshake 440 with the second server (e.g., 415) based on the first secure handshake. The second secure handshake 450 may comprise the host name of the second server 415. At block 540, the proxy server (e.g., 200, 420) may intercept from the second server 415 a second secure handshake response 445 comprising a server certificate with metadata. At block 545, the proxy server (e.g., 200, 420) may generate a second certificate using the metadata and signed with the certificate authority (e.g., 202) associated with globally unique identifier registered for the endpoint (e.g., 100, 410). At block 550, the proxy server (e.g., 200, 420) may transmit to the user endpoint (e.g., 100, 410) a modified response 450 to the secure connection request 425 secured with second generated certificate to establish a proxied secure connection.

Figure 6:
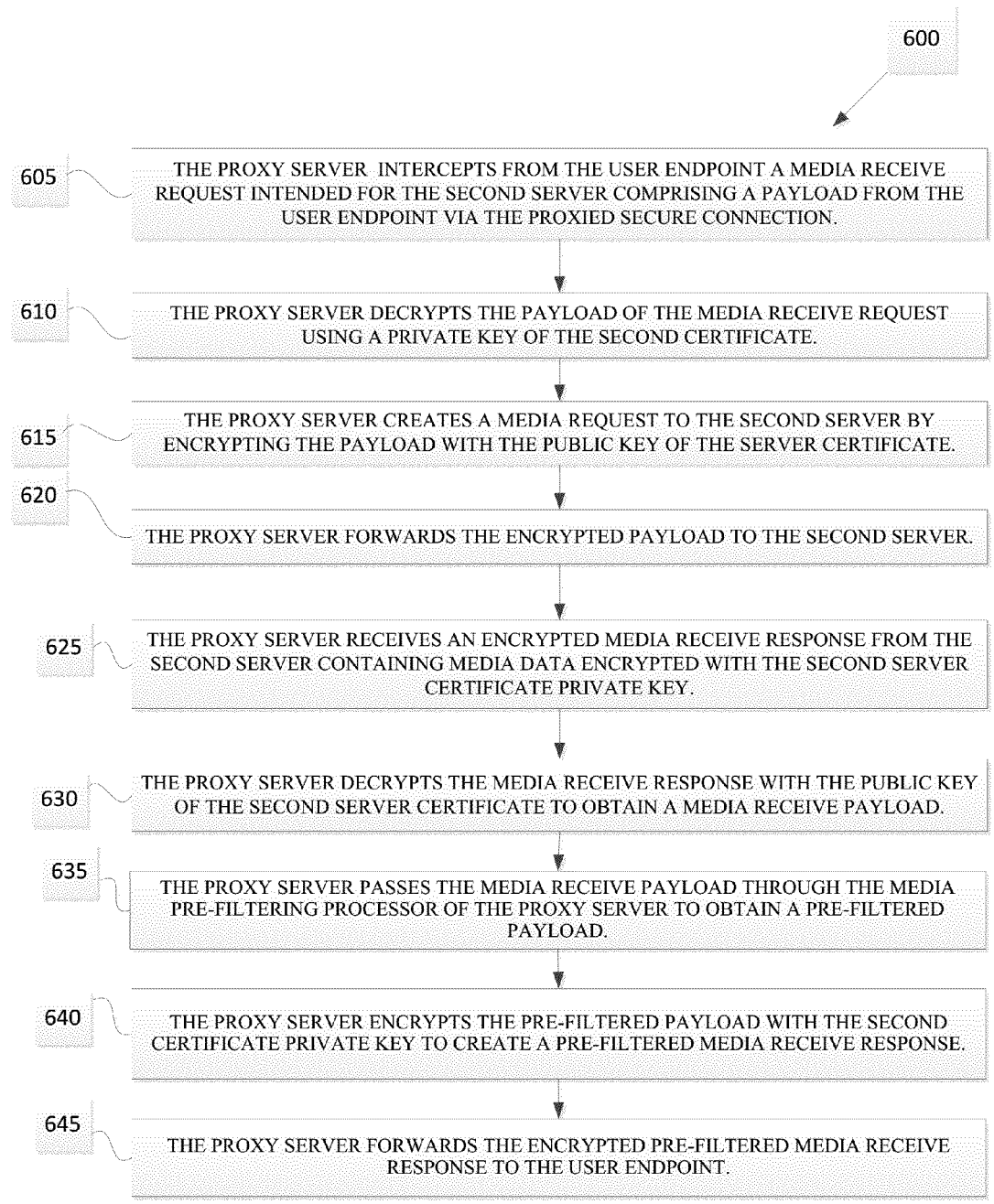
FIG. 6 is a flow diagram illustrating an example of a method for requesting a media asset by the user endpoint from the second server and optimizing reception of the media asset, in which examples of the present disclosure may operate.

FIG. 6 is a flow diagram illustrating an example of a method 600 for requesting a media asset by the user endpoint (e.g., 100, 410) from the second server 415 and optimizing reception of the media asset, in which examples of the present disclosure may operate. The method 600 may be performed by a computer system 1000 of FIG. 10 and may comprise hardware (e.g., circuitry, dedicated logic, programmable logic, microcode, etc.), software (e.g., instructions run on a processing device), or a combination thereof. In one example, the method 600 may be performed primarily by the proxy server 200, 420 of FIGS. 2 and 4.

As shown in FIGS. 1, 2, 4 and 5, at block 605, the proxy server (e.g., 200, 420) may intercept from the user endpoint (e.g., 100, 410), a media receive request 455 intended for the second server 415 comprising a payload from the user endpoint (e.g., 100, 410) via the proxied secure connection. At block 610, the proxy server (e.g., 200, 420) may decrypt the payload of the media receive request 455 using a private key of the second certificate. At block 615, the proxy server (e.g., 200, 420) may create a media request 460 to the second server 415 by encrypting the payload with the public key of the server certificate received in 445. At block 620, the proxy server (e.g., 200, 420) may forward the re-encrypted payload to the second server 415.

At block 625, the proxy server (e.g., 200, 420) may receive an encrypted media receive response 465 from the second server 415 containing media data encrypted with the second server certificate 445 private key. At block 630, the proxy server (e.g., 200, 420) may decrypt the media receive response 465 with the public key of the second server certificate received in 445 to obtain a media receive payload 470. At block 635, the proxy server (e.g., 200, 420) may pass the media receive payload 470 through the media pre-filtering processor (e.g. 280, 475) of the proxy server (e.g., 200, 420) to obtain a pre-filtered payload 480. In one example, the proxy server (e.g., 200, 420) passing the media receive payload 470 through the media pre-filtering processor 475 of the proxy server (e.g., 200, 420) may comprise the media pre-filtering processor 475 performing at least one of resolution reduction, dynamic range reduction, frame rate reduction, spatial high frequency reduction, spatio-temporal high frequency reduction, entropy coding of protocol headers, or DCT or wavelet coefficient re-quantization of the media, audio, images or video payloads.

At block 640, the proxy server (e.g., 200, 420) may encrypt the pre-filtered payload with the second certificate 202 private key to create a pre-filtered media receive response 485. At block 645, the proxy server (e.g., 200, 420) may forward the encrypted pre-filtered media receive response 485 to the user endpoint (e.g., 100, 410)

The user endpoint (e.g., 100, 410) may decrypt the encrypted pre-filtered media receive response 485 with the second certificate public key to obtain a pre-filtered media payload 487. The user endpoint (e.g., 100, 410) may pass the pre-filtered media payload 487 through post-filtering and restoration 490 by the post-filtering processor (e.g., 195) of the user endpoint (e.g., 100, 410) to obtain post-filtered media 492. The user endpoint (e.g., 100, 410) may store or render the post-filtered media 492 into storage (e.g., 199) or a render device 495 (e.g., the display 198). In an example, the user endpoint (e.g., 100, 410) may pass the pre-filtered media payload through post-filtering and restoration 490 by the post-filtering processor (e.g., 195) of the user endpoint (e.g., 100, 410) may comprise transrating and other coefficient modifications in the compressed domain. In an example, the user endpoint (e.g., 100, 410) may pass the pre-filtered media payload through post-filtering and restoration 490 by the post-filtering processor (e.g., 195) of the user endpoint (e.g., 100, 410) may comprise super-resolution or non-linear interpolation methods in any of the audio frequency, DCT, image spatial, color gamut, or video statio-temporal domains.

In one example, the proxy server (e.g., 200, 420) may communicate the media receive payload 470 to a transcoding or a transrating service using the Internet Content Adaptation Protocol (ICAP), as disclosed in IETF 3507, incorporated herein by reference. In another example, the proxy server (e.g., 200, 420) may communicate the media receive payload 470 to a transcoding or a transrating service using synchronous or asynchronous application programming interface (API) calls.

Figure 7:
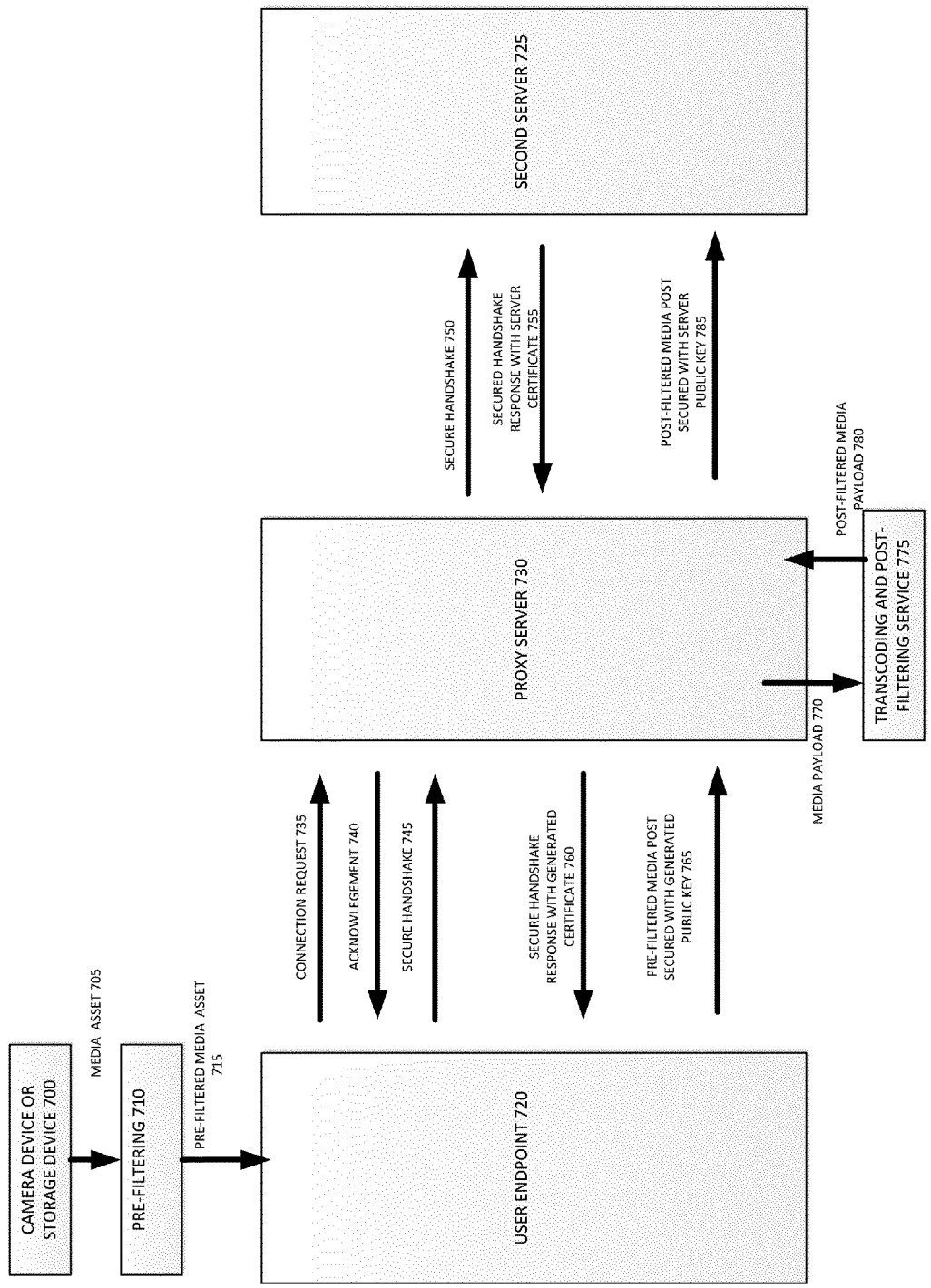
FIG. 7 is a protocol diagram that illustrates an example media post and transmission data flow representing a user endpoint communicating with a proxy server for transmitting media, audio, image or video data from the user endpoint to a second server via the proxy server, in which examples of the present disclosure may operate.
Figure 8:
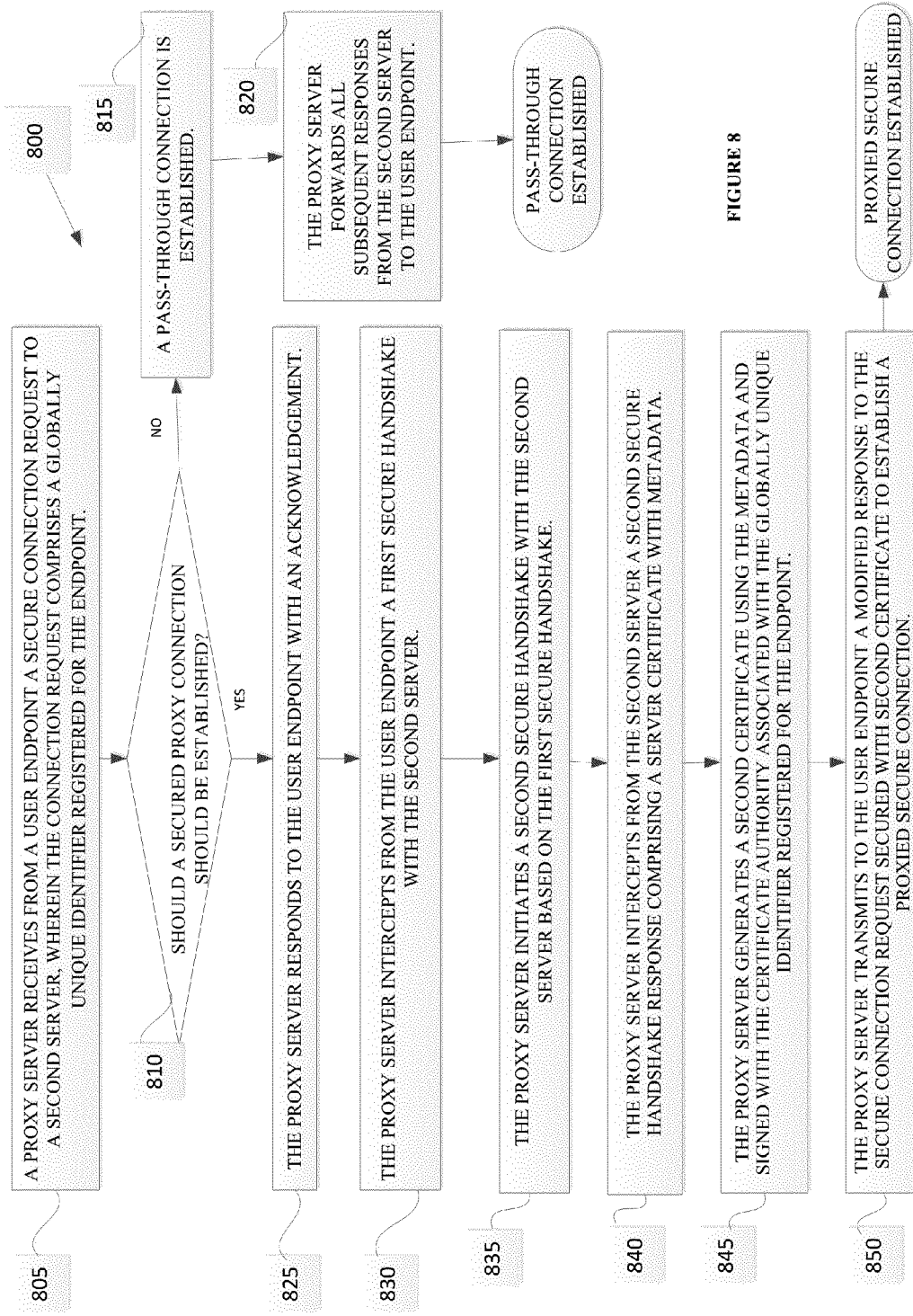
FIG. 8 is a flow diagram illustrating an example of a method for the user endpoint communicating with a proxy server to post media, audio, image or video data to a second server via the gateway proxy server, in which examples of the present disclosure may operate.

FIG. 7 is a protocol diagram 700 that illustrates an example media post and transmission data flow representing a user endpoint (e.g., 100, 720) communicating with a proxy server (e.g., 200, 730) for transmitting media, audio, image or video data from the user endpoint (e.g., 100, 720) to a second server 725 via the proxy server (e.g., 200, 730), in which examples of the present disclosure may operate. FIG. 8 is a flow diagram illustrating an example of a method 800 for the user endpoint (e.g., 100, 720) communicating with a proxy server (e.g., 200, 730) for posting media, audio, image or video data to a second server 725 via the proxy server (e.g., 200, 730), in which examples of the present disclosure may operate. The method 800 may be performed by a computer system 1000 of FIG. 10 and may comprise hardware (e.g., circuitry, dedicated logic, programmable logic, microcode, etc.), software (e.g., instructions run on a processing device), or a combination thereof. In one example, the method 800 may be performed primarily by the proxy server (e.g., 200, 730) of FIGS. 2 and 7.

As shown in FIGS. 1, 2, 7 and 8, at block 805, a proxy server (e.g., 200, 730) may receive from a user endpoint (e.g., 100, 720) a secure connection request 735 to a second server (e.g., 725). The secure connection request 735 may include a globally unique identifier registered for the endpoint (e.g., 100, 720). In an example, prior to receiving the secure connection request 735 to the second server (e.g., 725), upon the proxy server (e.g., 200, 730) may be installed a first certificate authority (e.g. step 335 of method 300). The first certificate authority may also be installed on the user endpoint (e.g., 100, 720). The first certificate authority may be generated using the globally unique identifier. Prior to receiving the secure connection request 735 to the second server (e.g., 725), the proxy server (e.g., 200, 730) may receive a registration that distinguishes the first certificate authority from other certificate authorities based on the globally unique identifier employed as a primary key.

In an example, prior to receiving a first secure connection, the proxy server (e.g., 200, 730) may receive a configuration to incorporate or communicate with a media pre-filtering processor (e.g., 280) to generated pre-filtered media, audio, images or video payloads. If, at block 810, the proxy server (e.g., 200, 730) determines that secure connection request 735 should be forwarded to the second server (e.g., 725) based on a rule or policy supplied by the network operator (not shown), then at block 815, a pass-through connection may be established, wherein the proxy server (e.g., 200, 730) may forward the secure connection request 735 and all subsequent secure connection session traffic without changes between the user endpoint (e.g., 100, 720) and the second server (e.g., 725). The rule or policy may be at least predicated on presence of the corresponding one of the certificate authorities (e.g., 102) on the user endpoint (e.g., 100, 720), information or policy supplied by the network operator, or the global identifier registration carried out in method step 340, or lack thereof. At block 820, the proxy server (e.g., 200, 730) may forward all subsequent responses from the second server (e.g., 725) to the user endpoint (e.g., 100, 720).

If, at block 810, the proxy server (e.g., 200, 730) determines that a secured proxy connection should be established, then at block 825, the proxy server (e.g., 200, 730) may respond to the user endpoint (e.g., 100, 720) with an acknowledgement 740.

At block 830, the proxy server (e.g., 200, 730) may intercept from the user endpoint (e.g., 100, 720) a first secure handshake 745 with the second server (e.g., 725). The first secure handshake 745 may comprise the host name of the second server (e.g., 725). At block 835, the proxy server (e.g., 200, 730) may not forward the first secure handshake 745 to second server (e.g., 725), but instead may initiate a second secure handshake 750 with the second server (e.g., 725) based on the first secure handshake. The second secure handshake 750 may comprise the host name of the second server (e.g., 725).

At block 840, the proxy server (e.g., 200, 730) may intercept from the second server (e.g., 725) a second secure handshake response 755 comprising a server certificate with metadata. At block 845, the proxy server (e.g., 200, 730) may generate a second certificate using the metadata and signed with the certificate authority (e.g., 202) associated with globally unique identifier registered for the endpoint (e.g., 100, 720). At block 850, the proxy server (e.g., 200, 730) may transmit to the user endpoint (e.g., 100, 720) a modified response 760 to the secure connection request 735 secured with generated second certificate to establish a proxied secure connection.

Figure 9:
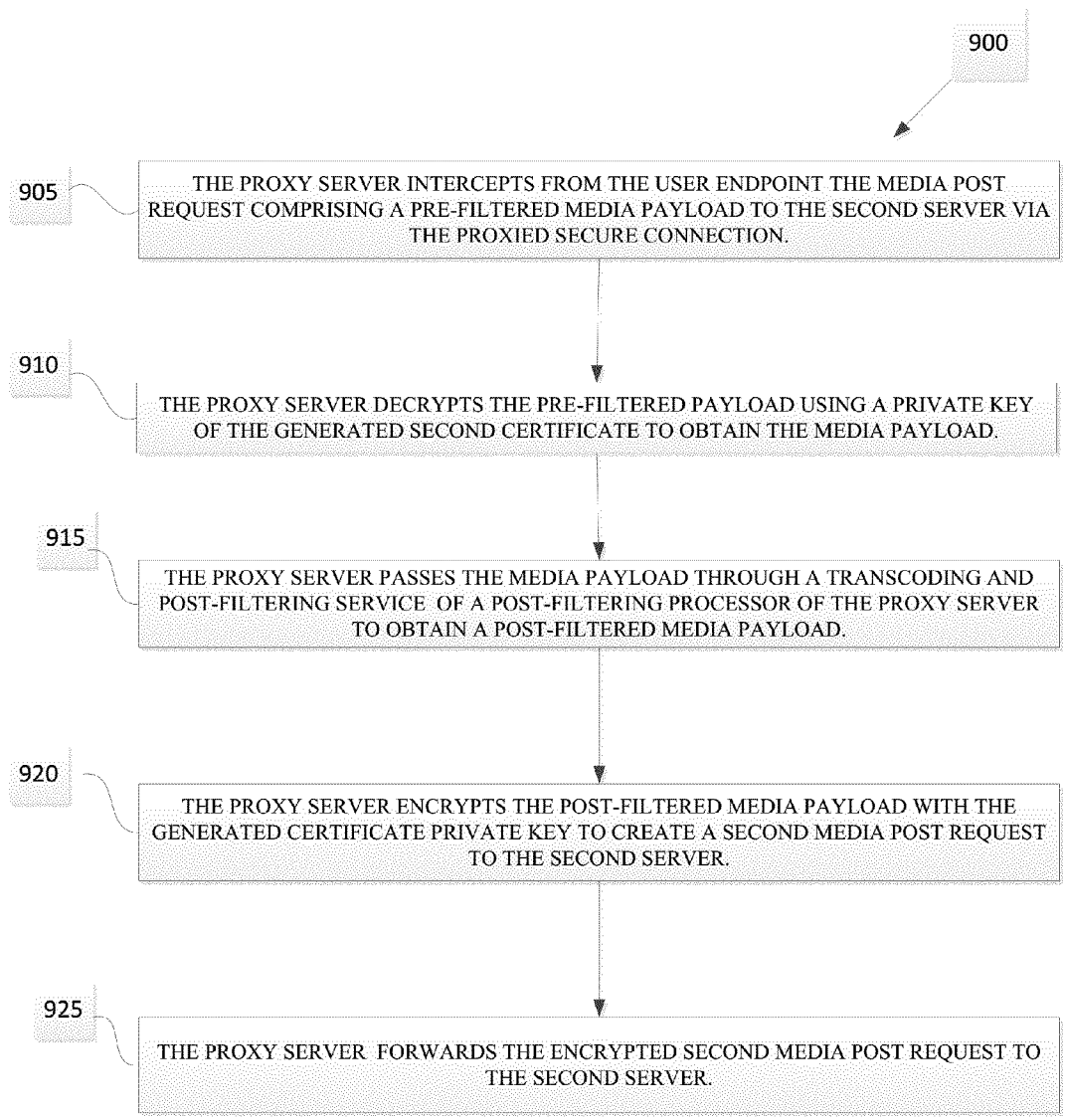
FIG. 9 is a flow diagram illustrating an example of a method for posting a media asset by a user endpoint to a second server and optimizing the transmission of the media asset, in which examples of the present disclosure may operate.

FIG. 9 is a flow diagram illustrating an example of a method 900 for posting a media asset by a user endpoint (e.g., 100, 720) to a second server 725 and optimizing the transmission of the media asset, in which examples of the present disclosure may operate. The method 900 may be performed by a computer system 1000 of FIG. 10 and may comprise hardware (e.g., circuitry, dedicated logic, programmable logic, microcode, etc.), software (e.g., instructions run on a processing device), or a combination thereof. In one example, the method 900 may be performed primarily by the proxy server (e.g., 200, 730) of FIGS. 2 and 7.

A camera device or storage device (115, 117, 700) may send a media asset 705 to a pre-filtering service 710 to obtain a pre-filtered media asset 715. The pre-filtering service 710 may send the media asset 705 to a pre-filtering processor (e.g., 160) of the user endpoint (e.g., 100, 720) that has established a proxied secured connection to the second server 725. The user endpoint 720 may initiate a media post 765 to the second server 725 with a generated certificate 760 public key.

As shown in FIGS. 1, 2, 7 and 9, at block 905, the proxy server (e.g., 200, 730) may intercept from the user endpoint the media post request 765 comprising a pre-filtered media payload to the second server 725 via the proxied secure connection. At block 910, the proxy server (e.g., 200, 730) may decrypt the pre-filtered payload using a private key of the generated second certificate 760 to obtain the media payload 770. At block 915, the proxy server (e.g., 200, 730) may pass the media payload 770 through a transcoding and post-filtering service 775 of a post-filtering processor (e.g., 240) of the proxy server (e.g., 200, 730) to obtain a post-filtered media payload. In one example, the proxy server (e.g., 200, 730) passing the pre-filtered media payload through the post-filtering processor (e.g., 240) may comprise the post-filtering processor (e.g., 240) performing one or more of super-resolution or non-linear interpolation methods in any of the audio frequency, DCT, image spatial, color gamut, or video statiotemporal domains. In an example, the proxy server (e.g., 200, 730) may communicate the pre-filtered media receive payload to the post-filtering processor (e.g., 240) using the Internet Content Adaptation Protocol (ICAP), as disclosed in IETF 3507, incorporated herein by reference. In an example, the proxy server (e.g., 200, 730) may communicate the pre-filtered media receive payload to the post-filtering processor (e.g., 240) using synchronous or asynchronous API calls.

At block 920, the proxy server (e.g., 200, 730) may encrypt the post-filtered media payload with the generated certificate private key to create a second media post request 785 to the second server 725. At block 925, the proxy server (e.g., 200, 730) may forward the encrypted second media post request to the second server 735.

Figure 10:
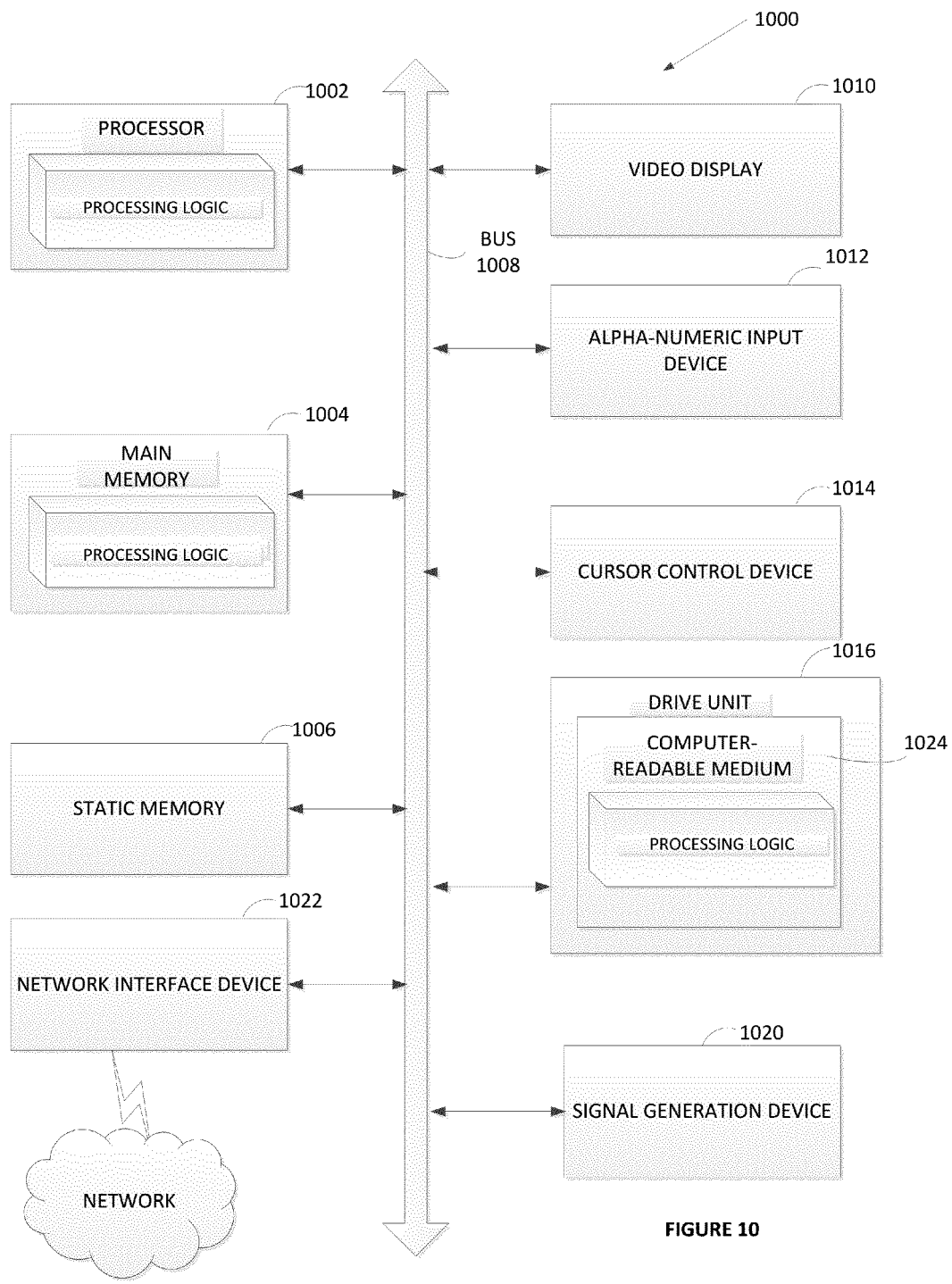
FIG. 10 illustrates a diagrammatic representation of a machine in the example form of a computer system within which a set of instructions, for causing the machine to perform any one or more of the methodologies discussed herein, may be executed.

FIG. 10 illustrates a diagrammatic representation of a machine in the example form of a computer system 1000 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processing device (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. Processing logic of the user endpoint 100 or the proxy server 200, respectively, may be executed by processor 1002 configured to perform the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

A drive unit 1016 may include a computer-readable medium 1024 on which is stored one or more sets of instructions (e.g., instructions of the processing logic of the user endpoint 100 or the proxy server 200, respectively) embodying any one or more of the methodologies or functions described herein. The instructions of the processing logic of the user endpoint 100 or the proxy server 200, respectively, may also reside, completely or at least partially, within the main memory 1004 and/or within the processor 1002 during execution thereof by the computer system 1000, the main memory 1004 and the processor 1002 also constituting computer-readable media. The instructions of the processing logic of the user endpoint 100 or the proxy server 200, respectively, may further be transmitted or received over a network via the network interface device 1022.

While the computer-readable storage medium 1024 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and translates to a new coordinate system the data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. The system and method as disclosed herein for the reception and transmission optimization of secured media, audio, video and image traffic via proxy solves problems in many fields, such as improving radio access network spectrum efficiency, reduction of backhaul costs, cost-effective real-time reduction of public radio-access-network congestion when both uploading and downloading audio, video and image data from mobile devices, and high-throughput treatment of secure audio, image and video traffic at the distribution network core without compromising endpoint security as but a few non-limiting examples.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:

receiving, by a proxy server from a user endpoint, a secure connection request to a second server, the secure connection request comprising a globally unique identifier registered for the user endpoint;

employing, by the proxy server, the globally unique identifier as a primary key to distinguish a first certificate authority of a plurality of certificate authorities installed in the proxy server from other certificate authorities of the plurality of certificate authorities installed in the proxy server;

responding, by the proxy server, with an acknowledgement to the user endpoint;

intercepting, by the proxy server from the user endpoint, a first secure handshake from the user endpoint to the second server;

initiating, by the proxy server, a second secure handshake on behalf of the user endpoint with the second server based on the first secure handshake;

intercepting, by the proxy server from the second server, a second secure handshake response comprising a server certificate and metadata;

generating, by the proxy server, a second certificate using the metadata and signed by the first certificate authority distinguished with the globally unique identifier registered for the user endpoint;

transmitting, by the proxy server to the user endpoint, a modified response to the secure connection request secured with the second certificate to establish a proxied secure connection;

intercepting, by the proxy server from the user endpoint, a media receive request intended for the second server comprising an encrypted payload from the user endpoint;

decrypting, by the proxy server, the encrypted payload using a private key of the second certificate;

creating, by the proxy server, a media request to the second server by encrypting the payload with the public key of the server certificate;

forwarding, by the proxy server, the encrypted payload to the second server;

receiving, by the proxy server, an encrypted media receive response from the second server containing media data encrypted with a private key associated with the generated second server certificate;

decrypting, by the proxy server, the encrypted media receive response with the public key of the second server certificate to obtain a media receive payload;

passing, by the proxy server, the media receive payload through a media pre-filtering processor of the proxy server to obtain a pre-filtered payload;

encrypting, by the proxy server, the pre-filtered payload with the private key associated with the second server certificate to create an encrypted pre-filtered media receive response; and forwarding, by the proxy server, the encrypted pre-filtered media receive response to the user endpoint.

2. The method of claim 1, further comprising determining whether to forward or not forward the secure connection request to the second server based on a rule or policy.

3. The method of claim 2, wherein the rule or policy is at least predicated on presence of a corresponding certificate authority of a plurality of certificate authorities on the user endpoint.

4. The method of claim 1, wherein passing the media receive payload through the media pre-filtering processor comprises performing at least one of resolution reduction, dynamic range reduction, frame rate reduction, spatial high frequency reduction, spatio-temporal high frequency reduction, entropy coding of protocol headers, or discrete cosine transform (DCT) or wavelet coefficient re-quantization of the media, audio, images or video payloads.

5. The method of claim 1, further comprising, prior to receiving a first secure connection, receiving a configuration, by the proxy server, to incorporate or communicate with a media pre-filtering processor to generate pre-filtered media, audio, images or video payloads.

6. The method of claim 1, wherein the proxy server communicates a media receive payload to a transcoding or a transrating service using the internet content adaptation protocol (ICAP).

7. The method of claim 1, wherein the proxy server communicates a media receive payload to a transcoding or a transrating service using asynchronous application programming interface (API) calls.

8. A system, comprising:
a memory;
a processing device, operatively coupled to the memory, the processing device to:
receive, from a user endpoint, a secure connection request to a second server, the secure connection request comprising a globally unique identifier registered for the user endpoint;
employ the globally unique identifier as a primary key to distinguish a first certificate authority of a plurality of certificate authorities installed in the proxy server from other certificate authorities of the plurality of certificate authorities installed in the proxy server;
respond with an acknowledgement to the user endpoint;
intercept, from the user endpoint, a first secure handshake from the user endpoint to the second server;
initiate a second secure handshake on behalf of the user endpoint with the second server based on the first secure handshake;
intercept, from the second server, a second secure handshake response comprising a server certificate and metadata;

generate a second certificate using the metadata and signed by the first certificate authority distinguished with the globally unique identifier registered for the user endpoint;
transmit, to the user endpoint, a modified response to the secure connection request secured with the second certificate to establish a proxied secure connection;
intercept, from the user endpoint, a media receive request intended for the second server comprising an encrypted payload from the user endpoint;
decrypt the encrypted payload using a private key of the second certificate;
create a media request to the second server by encrypting the payload with the public key of the server certificate;
forward the encrypted payload to the second server;
receive an encrypted media receive response from the second server containing media data encrypted with a private key associated with the generated second server certificate;
decrypt the encrypted media receive response with the public key of the second server certificate to obtain a media receive payload;
pass the media receive payload through a media pre-filtering processor of the proxy server to obtain a pre-filtered payload;
encrypt the pre-filtered payload with the private key associated with the second server certificate to create an encrypted pre-filtered media receive response; and
forward the encrypted pre-filtered media receive response to the user endpoint.

9. A method, comprising:
receiving, by a proxy server from a user endpoint, a secure connection request to a second server, the secure connection request comprising a globally unique identifier registered for the user endpoint;
employing, by the proxy server, the globally unique identifier as a primary key to distinguish a first certificate authority of a plurality of certificate authorities installed in the proxy server from other certificate authorities of the plurality of certificate authorities installed in the proxy server;
responding, by the proxy server, with an acknowledgement to the user endpoint;
intercepting, by the proxy server from the user endpoint, a first secure handshake from the user endpoint to the second server;
initiating, by the proxy server, a second secure handshake on behalf of the user endpoint with the second server based on the first secure handshake;
intercepting, by the proxy server from the second server, a second secure handshake response comprising a server certificate and metadata;
generating, by the proxy server, a second certificate using the metadata and signed by the first certificate authority distinguished with the globally unique identifier registered for the user endpoint;
transmitting, by the proxy server to the user endpoint, a modified response to the secure connection request secured with the second certificate to establish a proxied secure connection;
intercepting, by the proxy server from the user endpoint, a media send request comprising an encrypted pre-filtered media payload to the second server via the proxied secure connection;

decrypting, by the proxy server, the encrypted pre-filtered media payload using a private key of the second certificate to obtain a pre-filtered media payload;

passing, by the proxy server, the pre-filtered media payload through a post-filtering processor to obtain a post-filtered media payload;

encrypting, by the proxy server, the post-filtered media payload with a generated certificate private key to create an encrypted second media post request; and forwarding, by the proxy server, the encrypted second media post request to the second server.

10. The method of claim 9, wherein passing the pre-filtered media payload through the post-filtering processor comprises performing one or more of super-resolution or non-linear interpolation methods in any of the audio frequency, discrete cosine transform (DCT), image spatial, color gamut, or video statio-temporal domains.

11. The method of claim 9, further comprising, communicating, by the proxy server, the pre-filtered media payload to the post-filtering processor using the internet content adaptation protocol (ICAP) protocol.

12. The method of claim 9, further comprising, communicating, by the proxy server, the pre-filtered media payload to the post-filtering processor using asynchronous application programming interface (API) calls.

13. A system, comprising:
a memory;
a processing device, operatively coupled to the memory, the processing device to:
  receive, from a user endpoint, a secure connection request to a second server, the secure connection request comprising a globally unique identifier registered for the user endpoint;
  employ the globally unique identifier as a primary key to distinguish a first certificate authority of a plurality of certificate authorities installed in the proxy server from other certificate authorities of the plurality of certificate authorities installed in the proxy server;
  respond with an acknowledgement to the user endpoint;
  intercept, from the user endpoint, a first secure handshake from the user endpoint to the second server;
  initiate a second secure handshake on behalf of the user endpoint with the second server based on the first secure handshake;
  intercept, from the second server, a second secure handshake response comprising a server certificate and metadata;
  generate a second certificate using the metadata and signed by the first certificate authority distinguished with the globally unique identifier registered for the user endpoint;
  transmit, to the user endpoint, a modified response to the secure connection request secured with the second certificate to establish a proxied secure connection;
  intercept, from the user endpoint, a media send request comprising an encrypted pre-filtered media payload to the second server via the proxied secure connection;
  decrypt the encrypted pre-filtered media payload using a private key of the second certificate to obtain a pre-filtered media payload;
  pass the pre-filtered media payload through a post-filtering processor to obtain a post-filtered media payload;
  encrypt the post-filtered media payload with a generated certificate private key to create an encrypted second media post request; and
  forward the encrypted second media post request to the second server.

14. A non-transitory computer-readable storage medium including instructions that, when accessed by a proxy server, cause the proxy server to perform operations comprising:
  receiving, by the proxy server from a user endpoint, a secure connection request to a second server, the secure connection request comprising a globally unique identifier registered for the user endpoint;
  employing, by the proxy server, the globally unique identifier as a primary key to distinguish a first certificate authority of a plurality of certificate authorities installed in the proxy server from other certificate authorities of the plurality of certificate authorities installed in the proxy server;
  responding, by the proxy server, with an acknowledgement to the user endpoint;
  intercepting, by the proxy server from the user endpoint, a first secure handshake from the user endpoint to the second server;
  initiating, by the proxy server, a second secure handshake on behalf of the user endpoint with the second server based on the first secure handshake;
  intercepting, by the proxy server from the second server, a second secure handshake response comprising a server certificate and metadata;
  generating, by the proxy server, a second certificate using the metadata and signed by the first certificate authority distinguished with the globally unique identifier registered for the user endpoint;
  transmitting, by the proxy server to the user endpoint, a modified response to the secure connection request secured with the second certificate to establish a proxied secure connection;
  intercepting, by the proxy server from the user endpoint, a media receive request intended for the second server comprising an encrypted payload from the user endpoint;
  decrypting, by the proxy server, the encrypted payload using a private key of the second certificate;
  creating, by the proxy server, a media request to the second server by encrypting the payload with the public key of the server certificate;
  forwarding, by the proxy server, the encrypted payload to the second server;
  receiving, by the proxy server, an encrypted media receive response from the second server containing media data encrypted with a private key associated with the generated second server certificate;
  decrypting, by the proxy server, the encrypted media receive response with the public key of the second server certificate to obtain a media receive payload;
  passing, by the proxy server, the media receive payload through a media pre-filtering processor of the proxy server to obtain a pre-filtered payload;
  encrypting, by the proxy server, the pre-filtered payload with the private key associated with the second server certificate to create an encrypted pre-filtered media receive response; and
  forwarding, by the proxy server, the encrypted pre-filtered media receive response to the user endpoint.

15. A non-transitory computer-readable storage medium including instructions that, when accessed by a proxy server, cause the proxy server to perform operations comprising:
  receiving, by the proxy server from a user endpoint, a secure connection request to a second server, the secure connection request comprising a globally unique identifier registered for the user endpoint;

employing, by the proxy server, the globally unique identifier as a primary key to distinguish a first certificate authority of a plurality of certificate authorities installed in the proxy server from other certificate authorities of the plurality of certificate authorities installed in the proxy server;

responding, by the proxy server, with an acknowledgement to the user endpoint;

intercepting, by the proxy server from the user endpoint, a first secure handshake from the user endpoint to the second server;

initiating, by the proxy server, a second secure handshake on behalf of the user endpoint with the second server based on the first secure handshake;

intercepting, by the proxy server from the second server, a second secure handshake response comprising a server certificate and metadata;

generating, by the proxy server, a second certificate using the metadata and signed by the first certificate authority distinguished with the globally unique identifier registered for the user endpoint;

transmitting, by the proxy server to the user endpoint, a modified response to the secure connection request secured with the second certificate to establish a proxied secure connection;

intercepting, by the proxy server from the user endpoint, a media send request comprising an encrypted pre-filtered media payload to the second server via the proxied secure connection;

decrypting, by the proxy server, the encrypted pre-filtered media payload using a private key of the second certificate to obtain a pre-filtered media payload;

passing, by the proxy server, the pre-filtered media payload through a post-filtering processor to obtain a post-filtered media payload;

encrypting, by the proxy server, the post-filtered media payload with a generated certificate private key to create an encrypted second media post request; and forwarding, by the proxy server, the encrypted second media post request to the second server.

* * * * *